No. 851,437. PATENTED APR. 23, 1907.
T. J. RAFTICAN.
COMBINED HOTEL REGISTER AND ACCOUNT CHECKING SYSTEM.
APPLICATION FILED AUG. 14, 1906.

UNITED STATES PATENT OFFICE.

THOMAS J. RAFTICAN, OF YOUNGSTOWN, OHIO.

COMBINED HOTEL-REGISTER AND ACCOUNT-CHECKING SYSTEM.

No. 851,437.  Specification of Letters Patent.  Patented April 23, 1907.

Application filed August 14, 1906. Serial No. 330,597.

*To all whom it may concern:*

Be it known that I, THOMAS J. RAFTICAN, a citizen of the United States, residing at Youngstown, in the county of Mahoning and State of Ohio, have invented a certain new and useful Improvement in a Combined Hotel-Register and Account-Checking System, of which the following is a specification.

This invention relates to bookkeeping systems, and has particularly in view a combined hotel register and account checking system embodied in a single card or sheet designed for registering guests at a hotel and dispensing with the usual hotel register.

To this end the invention contemplates a simple and practical means of registering and keeping the accounts of hotel guests without the necessity of employing the ordinary hotel register with which is associated an elaborate and intricate system of bookkeeping in order to check up the arrival, time, and departure of a guest, as well as the miscellaneous and extra account. Ordinarily, in the use of the common hotel register, it is necessary to transfer the entries from it to the ledger and also the bookkeepers are compelled to keep daily entries of charges in the ledger against each guest.

The above details, in connection with the use of the ordinary hotel register or bookkeeping system, are entirely obviated by the use of the present invention which provides on a single card or sheet means for keeping a complete register record, and also a complete ledger account for each guest, without the necessity of maintaining a register book on the hotel counter or maintaining any other record than preferably a record book of the individual cards or sheets, for purposes of precaution in maintaining an extra check on the cashier, and a cash book if desired.

Another important and practical object of the invention is to combine with the improved register card a tear off coupon in the form of a meal ticket, preferably arranged in inverted relation to the printed matter on the card proper, and affording an additional means of taking care of the entire transaction with the guest including the room, meal, and extras accounts.

A practical feature in connection with the tear off coupon is the inverted relation thereof with reference to the data of the card proper, whereby the hotel clerk can fill out the coupon or meal ticket while the guest is registering, thus saving time in busy hours. Also, in this connection the inverting of the meal ticket coupon prevents the guest from registering in the spaces thereon instead of on the register card proper. Also, the present invention assures privacy as no register of guests remains on the desk open to the inspection of unauthorized parties.

With these and other objects in view, which will more readily appear as the nature of the invention is better understood, the same consists in the novel combination and arrangement of parts hereinafter more fully described, illustrated and claimed.

The essential features of the invention involved in carrying out the objects above indicated are necessarily susceptible of some structural modification without departing from the scope of the invention, but a preferred embodiment thereof is shown in the accompanying drawings, in which:—

Figure 1 is a plan view of a card or sheet embodying the present invention, showing one end of the meal ticket coupon severed from the body of the card proper to illustrate the tear off feature of such coupon. Fig. 2 is a detail plan view of a portion of a sheet or page from the card record book, which may be employed for keeping a tabular record of the individual registry cards or sheets.

The present invention is embodied in a single register card or sheet designated by the numeral 1, and preferably a pad or tablet of these cards or sheets, in blank, is kept on the counter or desk of a hotel in place of the ordinary hotel register book, so that one of the cards or sheets is utilized for each guest. As a part of this register card, the latter includes in and on the same sheet therewith, a tear off coupon in the form of a meal ticket and designated by the reference letter M. This tear off coupon is separated from the register card proper by a transverse tear line 15 formed by scoring or perforating, and providing means whereby said meal ticket coupon M may be torn off in connection with the transaction with each guest. The details of said meal ticket coupon, the arrangement of matter thereon, and its relation to the register card proper, will be hereinafter more particularly pointed out.

Referring now to the detail features of the register card proper, it will be observed from Fig. 1 of the drawings that the same is provided on the upper portion thereof with a suitable heading such as the name of the hotel or hotel company, and also the upper portion of the card is provided with a group of horizontal rulings 2 having opposite the same the words "Name" and "Residence" and over which lines are designed to be written the name and residence of the registering guest. The lines or rulings 2 provide what may be termed a registering space for the name and residence of the guest, and within the field of this registering space there are also arranged lines or spaces 3 and 4 having opposite the same the indications "Room" and "No." respectively, and which spaces are designed to respectively receive therein the number of the room to which the guest is assigned, and the serial or record number of the register card itself.

Immediately below the registering space for the guest, the card or sheet 1 is provided with a narrow block 5 of horizontal rulings 6 crossed by other vertical rulings 7 forming a single horizontal row of entry spaces, constituting what may be properly termed a register-record table readable from left to right. Each of the entry spaces in said register-record table 5 is separated from the adjacent entry space by double rulings, and each of said spaces also has an indicating heading. One of these entry spaces in the register-record table located at the extreme left-hand end of said table, is provided with a heading consisting of the word "Arrival" and is sub-divided into small blocks or spaces each having headings consisting respectively of the abbreviations "B," "D," "S," "L." The next succeeding space of the register-record table is also sub-divided for a date entry therein and is provided with a heading consisting of the word "Departure." The remaining entry spaces of the register-record table are provided with headings consisting respectively, of the word "Days," the abbreviations "A" and "E," the word "Rate," and the word "Amount."

Below the spaces forming the horizontal table or block 5 for the register-record, the register card or sheet is provided with a larger block 8 of vertical and horizontal rulings 9ª and 10ª forming a plurality of vertical columns constituting what may be termed a miscellaneous account table having a main title or heading preferably consisting of the word "Extras" arranged in the space between the table 5 and the table 8.

Each of the vertical columns of the miscellaneous table or block 8 is provided with an individual indicating heading, and certain of said columns are provided with sub-headings, so as to cover a great variety of subjects upon which an account may be run against a guest. The main headings of the vertical columns of the table or block 8 are usually the abbreviations "Misc.," "Ldy," "Tel'ph'ne," the word "Teleg'ms," the word "Express," and the word "Bar;" and the sub-headings suggested in the drawings are "Extra meals," "Service," "Cash," "Pressing."

In addition to the separate tables 5 and 8, a distinctive feature of the invention resides in providing the card or sheet 1 with vertical ledger rulings 9 forming a vertical ledger space 10 which is common to both of the separate tables 5 and 8. This ledger space 10 (or double column for dollars and cents) is arranged across one end of these tables or sets of rulings. Also, the vertical ledger space 10 extends across and directly adjoins the ends of the separate tables 5 and 8, so that the horizontal rulings of these tables extend across the ledger space to constitute a part thereof.

The common ledger space 10 is headed by the heading "Amount," and is provided at the bottom total space 11 opposite which is arranged the designating words "Amount paid."

Referring now to the tear off meal ticket coupon M, it will be observed that the same is arranged in inverted relation to the card proper 1, that is, the printed matter on the face of said coupon is reversed with relation to that on the card proper, thereby preventing the guest from registering on the coupon instead of on the card proper which would be likely to occur with careless or hurried guests. Also, by reason of the reversed or inverted arrangement of the printed matter on the meal ticket coupon, the clerk is enabled to fill out the meal ticket and make the assignment while the guest is registering, thus saving time in the rush of busy hours.

It will be observed that the meal ticket coupon M is intended to bear thereon matter corresponding to that on the card proper, that is, the name of the guest, the date of arrival, room number, and file number, so that there is a complete tally between the meal ticket and the card proper for the guest. To provide for this, the meal ticket coupon is preferably headed by the name of the house or hotel and one corner is provided with a space 16 having opposite the same the indication "Room" and in the directly opposite corner the coupon is provided with a space or ruling 17 having the indication "No." Also, the meal ticket coupon is provided with a group of horizontal rulings 18 designated respectively "Name" and "Arrived" and providing spaces in which are written the name of the guest and the date of arrival. In addition to the features mentioned, it is preferable to conspicuously print on the meal ticket coupon the notices "Please present at dining room," "Deliver to cashier when settling" and "Not transferable." Any other suitable matter may be printed on the coupon as well as the card proper, without departing from the invention.

In connection with the meal ticket coupon it is also preferable to arrange the spaces for the room number and card number in such positions that when the coupon is attached to the card proper, the room number and card number on the coupon will come immediately above the corresponding numbers on the card proper.

Referring more particularly to the use of the register car or sheet proper, when a guest arrives at the hotel, he simply writes his name and address in the top registering space of the card. The clerk then writes thereon the number of his room (481), arrival (7th day of month), and for dinner indicates by a mark under the abbreviation "D." Also, the clerk marks the plan (under "A" for American plan), and indicates the rate ($3.50), and by means of a time or clock stamp, stamps on the card, preferably upon the back, the exact time of arrival (2:47 P. M.), see dotted lines in Fig. 1. With this register-record upon the card or sheet 1, the same is then placed in an ordinary index file, such as commonly employed for card indexing and other purposes, and from that time on the cashier takes care of the entire matter so that when the guest is ready to depart and delivers to the cashier his meal ticket coupon the card proper is removed from the file and the cashier can readily compute the results. For instance, in the illustration given, the cashier notes on the card, preferably in red ink, the date of departure (Feb. 10), number of days for which charge is made (3) and the total amount of the bill ($10.50), entering up at the foot of the ledger space 10 the total amount paid ($10.50). Of course, if any extras are charged under the miscellaneous account table 8, the same will be added to the regular hotel bill under the ledger space 10.

In carrying out this system it may be desirable to use a cash book, but it is preferable to employ what is herein termed a card record book having sheets 11ª provided with horizontal and vertical rulings 12 and 13 providing columns having headings consisting of "Card No." "Room" and "Name" so that a checking record of each individual card or sheet may be kept. This constitutes means whereby an extra check on the cashier can be readily preserved.

I claim:

1. In a hotel register and checking system, a register card provided with a plurality of rulings having appropriate designations providing spaces for the registry of a guest and for the keeping and checking of his individual account, said card being further provided at one edge with a coupon having rulings and designations similar to certain of those on the card proper, and with an indicated tear-line between the coupon and the card proper.

2. In a hotel register and checking system, a register card provided with a plurality of rulings having appropriate designations providing spaces for the registering of a hotel guest and the keeping and checking of his individual account, said card being further provided with a coupon having rulings and designations similar to certain of those on the card proper but arranged in inverted relation thereto, the card being also provided with an indicated tear-line between the coupon and the card proper.

3. In a hotel register and checking system, a single register card provided with a group of horizontal rulings near the top thereof, a narrow block of rulings forming a plurality of entry spaces respectively having headings consisting of the words and abbreviations "Arrival," "B," "D," "S," "L," "Departure," "Days," "A," "E," and "Rate;" a separate larger block of rulings spaced from said narrow blocks and forming a series of vertical columns, each having headings; and a double column for dollars and cents ruled across one end of and directly adjoining both the said narrow and separate blocks of rulings.

In testimony whereof I hereunto affix my signature in the presence of two witnesses.

THOMAS J. RAFTICAN.

Witnesses:
M. BAUMAN,
JENNIE HUGHSON.